(12) United States Patent
Minaki et al.

(10) Patent No.: US 10,549,772 B2
(45) Date of Patent: Feb. 4, 2020

(54) ELECTRIC POWER STEERING APPARATUS

(71) Applicant: NSK LTD., Tokyo (JP)

(72) Inventors: Ryo Minaki, Tokyo (JP); Hiroaki Takase, Tokyo (JP); Hideki Sawada, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/311,856

(22) PCT Filed: Jul. 14, 2017

(86) PCT No.: PCT/JP2017/025707
§ 371 (c)(1),
(2) Date: Dec. 20, 2018

(87) PCT Pub. No.: WO2018/016436
PCT Pub. Date: Jan. 25, 2018

(65) Prior Publication Data
US 2019/0337553 A1 Nov. 7, 2019

(30) Foreign Application Priority Data
Jul. 20, 2016 (JP) .................. 2016-142621

(51) Int. Cl.
*H02P 6/10* (2006.01)
*B62D 5/04* (2006.01)
(Continued)

(52) U.S. Cl.
CPC ............... *B62D 5/046* (2013.01); *H02P 6/10* (2013.01); *H02P 21/05* (2013.01); *H02P 21/13* (2013.01)

(58) Field of Classification Search
CPC .. H02P 21/13; H02P 6/10; B62D 5/04; B62D 6/00
See application file for complete search history.

(56) References Cited

U.S. PATENT DOCUMENTS

2015/0333681 A1* 11/2015 Matsuki .................. H02P 21/06
318/400.02

FOREIGN PATENT DOCUMENTS

DE    10 2005 052 015 A1    6/2006
JP         2002-325499 A    11/2002
(Continued)

OTHER PUBLICATIONS

International Search Report for PCT/JP2017/025707, dated Sep. 26, 2017.

*Primary Examiner* — Muhammad S Islam
(74) *Attorney, Agent, or Firm* — Sughrue Mion, PLLC

(57) ABSTRACT

A vector control type electric power steering apparatus that compensates a dead time of an inverter, a motor back-EMF and an interference voltage by means of a mutual inductance between motor windings, improves a distortion of a current waveform and a responsibility of a current control, and suppresses a noisy sound, vibration and a ripple. The apparatus driving-controls a three-phase brushless motor which applies an assist torque to a steering mechanism of a vehicle by using a current command value calculated based on at least a steering torque, and vector-controls the three-phase brushless motor by using dq-axis command values that are converted from the current command value via an inverter, including: a 3-phase disturbance observer to compensate respective phase disturbance voltages, which include a dead time of the inverter, for 3-phase voltage command values.

11 Claims, 13 Drawing Sheets

(51) Int. Cl.
 *H02P 21/13* (2006.01)
 *H02P 21/05* (2006.01)

(56) References Cited

FOREIGN PATENT DOCUMENTS

| | | | |
|---|---|---|---|
| JP | 2005-160221 | A | 6/2005 |
| JP | 3706296 | B2 | 10/2005 |
| JP | 2006-166628 | A | 6/2006 |
| JP | 2007-252163 | A | 9/2007 |
| JP | 2010-041867 | A | 2/2010 |
| JP | 2016-054594 | A | 4/2016 |

\* cited by examiner

PRIOR ART

PRIOR ART

PRIOR ART

ELECTRIC POWER STEERING APPARATUS

CROSS REFERENCE TO RELATED APPLICATIONS

This Application is a National Stage of International Application No. PCT/JP2017/025707 filed Jul. 14, 2017, claiming priority based on Japanese Patent Application No. 2016-142621 filed Jul. 20, 2016.

TECHNICAL FIELD

The present invention relates to an electric power steering apparatus that enables to smoothly assist-control by vector-controlling a drive of a three-phase brushless motor by using a dq-axes rotational coordinate system, and compensating disturbance such as a dead time of an inverter, aback-electromotive voltage (a back-EMF) of the motor and an interference voltage by means of a mutual inductance between windings, and in particular to the high-performance electric power steering apparatus that improves a distortion of a current waveform and a response of a current control, and restricts a noisy sound, vibration, and a ripple by using a 3-phase disturbance observer and a spatial vector modulating section that are interposed in a three-phase axes.

BACKGROUND ART

An electric power steering apparatus (EPS) which provides a steering mechanism of a vehicle with a steering assist torque (an assist torque) by means of a rotational torque of a motor, applies a driving force of the motor as an actuator to a steering shaft or a rack shaft by means of a transmission mechanism such as gears or a belt through a reduction mechanism. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor by means of a voltage control command value Vref obtained by performing compensation or the like to the calculated current command value. A steering angle sensor 14 is not indispensable and may not be provided. It is possible to obtain the steering angle (a motor rotational angle) θ from a rotational position sensor such as a resolver which is connected to the motor 20.

The controller area network (CAN) 40 to send/receive various information and signals on the vehicle is connected to the control unit 30, and it is also possible to receive the vehicle speed Vs from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a central processing unit (CPU) (including a micro processing unit (MPU) and a micro controller unit (MCU)), and general functions performed by programs within the CPU are, for example, shown in FIG. 2.

Functions and operations of the control unit 30 will be described with reference to FIG. 2. The steering torque Th from the torque sensor 10 and the vehicle speed Vs from the vehicle speed sensor 12 are inputted into a current command value calculating section 31. The current command value calculating section 31 calculates a current command value Iref1 based on the steering torque Th and the vehicle speed Vs using an assist map or the like. The calculated current command value Iref1 is added with a compensation signal CM for improving characteristics from a compensating section 34 at an adding section 32A. The current command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

The subtraction result ΔI (=Irefm−Im) in the subtracting section 32B is current-controlled such as a proportional integral (PI) at a at a PI-control section 35. The voltage control value Vref obtained by the current-control, and a modulation signal (a carrier) CF are inputted into a PWM-control section 36, whereat a duty thereof is calculated. The motor 20 is PWM-driven by an inverter 37 with a PWM-signal calculated the duty. The motor current value Im of the motor 20 is detected by a motor current detection means 38 and is inputted into the subtracting section 32B for the feedback.

The compensating section 34 adds a self-aligning torque (SAT) detected or estimated and an inertia compensation value 342 at an adding section 344. The addition result is further added with a convergence control value 341 at an adding section 345. The addition result is inputted into the adding section 32A as the compensation signal CM, thereby to improve the control characteristics.

Recently, the three-phase brushless motor is mainly used to the actuator of the electric power steering apparatus. Since the electric power steering apparatus is an on-vehicle product, the inverter, which drives the motor, in comparison with general industries such as home electric appliances, needs to have a large dead time ("industrial equipment"<"EPS") in view of a wide operating temperature range and a fail-safe. Generally, since a switching device (for example, a field-effect transistor (an FET)) has a delay time when turning-OFF, when an upper arm and a lower arm of the switching devices are turned-ON or turned-OFF at the same time, a situation that a direct current (DC) link is short circuit is occurred. In order to prevent from the above case, the time (the dead time), which both the upper and lower arms of the switching devices turn-OFF, is set.

As a result, the current waveform is distorted, and the response of the current control and a steering feeling are badly affected. For example, when the driver slowly steers the handle in a situation that the handle is around a straight running state (an on-center state), a discontinuous steering feeling by means of the torque ripple and like is occurred. Further, since the back-EMF of the motor at a while speed steering maneuver or a high speed steering maneuver and the interference voltage between the windings act as the disturbance against the current-control, a steering follow-up performance and a steering feeling at a turning back maneuver go down.

A q-axis to control the torque being the coordinate axis of a rotor of the 3-phase brushless motor and a d-axis to control the magnetic field strength are independently set and has a relation that the d-axis and the q-axis is 90°. Thus, a vector control system to control the currents (the d-axis current command value and the q-axis current command value) corresponding to respective axes with the vector, is known.

FIG. 3 shows a configuration example in a case that a 3-phase brushless motor 100 is driving-controlled by the vector control system. A d-axis current command value id* and a q-axis current command value iq*, which are calculated in the current command value calculating section (not shown) based on the steering torque Th, the vehicle speed Vs and so on, of a dq-axis coordinate system of two axes are respectively inputted into subtracting sections 131d and 131q, and current deviations Δid* and Δiq* obtained in the subtracting sections 131d and 131q are respectively inputted into PI-control sections 120d and 120q. Voltage command values vd and vq PI-controlled in the PI-control sections 120d and 120q are respectively inputted into a subtracting section 121d and an adding section 121q, and voltages Δvd and Δvq obtained in the subtracting section 121d and the adding section 121q are inputted into a dq-axis/3-phase alternative current (AC) converting section 150. Voltage command values Vu*, Vv*, Vw* converted into 3-phases in the dq-axes/3-phase AC converting section 150 are inputted into a PWM-control section 160, and the motor 100 is driven with calculated duties via the inverter 161.

The 3-phase motor currents iu, id, iw of the motor 100 are detected by current detectors 162, and the detected 3-phase motor currents iu, id, iw are inputted into a 3-phase AC/dq-axes converting section 130. Feedback currents id and iq of 2-phases converted in the 3-phase AC/dq-axes converting section 130 are respectively inputted into subtracting sections 131d and 131q, and further inputted into a d-q non-interference control section 140. Further, a rotational sensor or the like is attached to the motor 100, and a motor rotational angle ω and a motor rotational speed (a rotational velocity) ω are outputted from an angle detecting section 110 to process the sensor signal. The motor rotational angle θ is inputted into the dq-axes/3-phase AC converting section 150 and the 3-phase AC/dq-axes converting section 130, and the motor rotational speed ω is inputted into the d-q non-interference control section 140.

Such an electric power steering apparatus of the vector control method is an apparatus that the steering of the driver is assisted, and the noisy sound, the vibration of the motor, the ripple and the like are transmitted as the force feeling to the driver via the handle. Further, the inverter sets the dead time so that the switching devices of the upper arm and the lower arm are not short-circuited. Since this dead time is non-linear, the current waveform is distorted, a responsibility of the control goes down and the noisy sound, the vibration the ripple and so on are occurred. Since an arrangement of the motor, which is directly coupled to a gearbox connected to the handle and the steel column shaft in a case of a column type electric power steering apparatus, is extremely close to the driver in considering the structure, the noisy sound, the vibration, the ripple and the like that are caused by the motor need to especially be considered in comparison with a downstream assist type electric power steering apparatus.

FIG. 4 shows a result in a case that sinusoidal wave is inputted into the d-axis current command value (a reference value) in the general dq-axis vector control (FIG. 3). It is understood that the waveform of the current measuring value is distorted for the d-axis current command value. Showing the motor current when the handle is slowly steered from the straight running state (the on-center state), as shown in FIG. 5 and FIG. 6, it is understood that the vibration and the ripple of the q-axis current (the torque) are large due to the distortion of the phase currents. FIG. 5 shows the U-phase motor current, the V-phase motor current and the W-phase motor current for the d-axis current command value and the q-axis current command value, and FIG. 6 shows only the q-axis current command value and the U-phase motor current from FIG. 5.

Conventionally, as a method to compensate the dead time of the inverter, there are methods to add the compensation value by detecting a timing occurring the dead time and to compensate the dead time by a disturbance observer on the dq-axes in the current control.

In the control unit of the electric power steering apparatus disclosed in Japanese Patent No. 3706296 B2 (Patent Document 1), the disturbance voltage estimating observer, which measures the disturbance voltage generated in the motor by using the voltage applied to the motor and the present current value of the motor and outputs a signal corresponding to the disturbance voltage, is disposed, and the dead time of the inverter is compensated. Further, in the control unit of the voltage type inverter disclosed in Japanese Unexamined Patent Publication No. 2007-252163 A (Patent Document 2), the disturbance estimating observer, which estimates the disturbance voltage including an output voltage error which is caused by the dead time of the inverter and an back-EMF electric power component of the motor, is disposed, and the dead time of the inverter is compensated.

THE LIST OF PRIOR ART DOCUMENTS

Patent Documents

Patent Document 1: Japanese Patent No. 3706296 B2
Patent Document 2: Japanese Unexamined Patent Publication No. 2007-252163 A

SUMMARY OF THE INVENTION

Problems to be Solved by the Invention

However, the control unit of Patent Document 1 compensates only the dead time of the inverter by the disturbance voltage estimating observer. Since the current controller is further disposed, the configuration is complicate, and since a high pass filter (HPF) is disposed depending on the embodiments, the problem of the deterioration of the characteristic is occurred. Further, the disturbance estimating observer in the control unit of the Patent Document 2 compensates only the dead time of the inverter. The motor back-EMF is compensated by a logic that is different from that of the disturbance estimating observer. Therefore, the sufficient control performance is not expected only by interposing the disturbance estimating observer. Further, the disturbance estimating observer on the dq-axes estimates the dead time as the voltage disturbance. However, since the third-order component of the signal is removed in the 2-phase/3-phase coordinate conversation, there is a problem that the effect is not adequate. In addition, in the control units of Patent Documents 1 and 2, since an inductance variation in a magnetic saturation region of the motor is not compensated, the problem that the current waveform is distorted is existed.

In the electric power steering apparatus, since the back-EMF of the motor is largely affected and the dead time occurrence timing near a zero cross point of the motor current is deviated, the effect of the dead time compensation in cases of Patent Documents 1 and 2 is not fully sufficient. Further, since a compensating accuracy is determined due to a back-EMF estimating logic with respect to the compensation of the motor back-EMF, the performance such as the steering follow-up performance is inadequate in the region that the estimating error is large. The motor back-EMF is non-linear, the non-linear component is enlarged by manufacturing variation of the motor, temperature variation of the motor itself, the region that the rotational speed of the motor is a while speed or a high speed. Then, it is extremely difficult to calculate the accurate compensation value of the back-EMF, which compensates the rotational speed and the like by using a linear operation equation.

The present invention has been developed in view of the above-described circumstances, and an object of the present invention is to provide the vector control type electric power steering apparatus that compensates the dead time of the inverter, the motor back-EMF and the interference voltage by means of the mutual inductance between the motor windings, improves the distortion of the current waveform and the responsibility of the current control, and suppresses the noisy sound, the vibration and the ripple. In this connection, the electric power steering apparatus comprises the 3-phase disturbance observer to compensate the disturbance voltage of the motor back-EMF and the like of the three-phase paths, and a spatial vector modulating section to superimpose the third harmonic wave and compensate the current distortion and the like in the current control path of the vector control.

Means for Solving the Problems

The present invention relates to an electric power steering apparatus that driving-controls a three-phase brushless motor which applies an assist torque to a steering mechanism of a vehicle by using a current command value calculated based on at least a steering torque, and vector-controls the three-phase brushless motor by using dq-axes command values that are converted from the current command value via an inverter, the above-described object of the present invention is achieved by that comprising: a 3-phase disturbance observer to compensate respective phase disturbance voltages, which include a dead time of the inverter, for 3-phase voltage command values.

The above-described object of the present invention is efficiently achieved by that: wherein the 3-phase disturbance observer includes phase observer sections comprising a motor model, an inverse motor model and a low pass filter (LPF) for each of three phases; or wherein the phase observer sections comprise a first subtracting section to subtract a disturbance estimation voltage from a phase voltage that is converted into three phases, a gain section to multiply a subtraction value from the first subtracting section by a gain, the motor model to input a phase voltage that adds a disturbance element to an output of the gain section, and to output a phase current, the inverse motor model to input the phase current, the low pass filter to input the subtraction value, and a second subtracting section to subtract an output of the low pass filter from an output of the inverse motor model, and to output the disturbance estimation voltage; or wherein a gain of the gain section is changeable depending on a motor rotational speed; or wherein the 3-phase disturbance observer comprises phase observer sections comprising a motor model, an inverse motor model and a low pass filter for two phases among the three phases, and an other-phase observer section, for an other phase among the three phases, comprising a motor model for an inverted phase voltage obtained by adding two phase voltages among the three phases and by inverting a sign of an added phase voltage; or wherein the phase observer sections comprise a first subtracting section to subtract a disturbance estimation voltage from a phase voltage that is converted into three phases, a first gain section to multiply a subtraction value from the first subtracting section by a gain, a first motor model to input a phase voltage that adds a disturbance element to an output of the first gain section, and to output a phase current, the inverse motor model to input the phase current, the low pass filter to input the subtraction value, and a second subtracting section to subtract an output of the low pass filter from an output of the inverse motor model, and to output the disturbance estimating voltage, and the other-phase observer section comprises an adding section to add two phase voltages among the converted three phase voltages, an inverting section to invert a sign of an output of the adding section, a second gain section to multiply an output of the inverting section by a gain, and a second motor model to input a phase voltage that adds a disturbance element to an output of the second gain section, and to output a phase current; or wherein gains of the first and second sections are changeable depending on a motor rotational speed; or wherein a compensation value of the 3-phase disturbance observer is changeable depending on a power supply voltage of the inverter; or wherein an inductance nominal value of the 3-phase disturbance observer is changeable depending on a current of the three-phase brushless motor; or wherein a spatial vector modulating section that superimposes a third harmonic wave is disposed at a subsequent stage of the 3-phase disturbance observer.

Effects of the Invention

According to the electric power steering apparatus of the present invention, since the 3-phase disturbance observer that compensates the disturbance voltage such as the back-EMF and the inverter dead time, is interposed in the three-phase paths of the current control, the compensation of the motor back-EMF and the compensation of the interference voltage due to the mutual inductance between the motor windings, can be performed. By disposing the spatial vector modulating section that superimposes the third harmonic wave, improves the voltage utilizing efficiency and performs the compensation of the dead time, the compensation in the dead time of the inverter, the improvement in the distortion of the current waveform, the improvement in the voltage utilizing efficiency, and the improvement in the responsibility of the current control, can be performed.

Further, since the control is smooth, the noisy sound and the vibration of the motor and the ripple can be suppressed.

MODE FOR CARRYING OUT THE INVENTION

Figure 7:
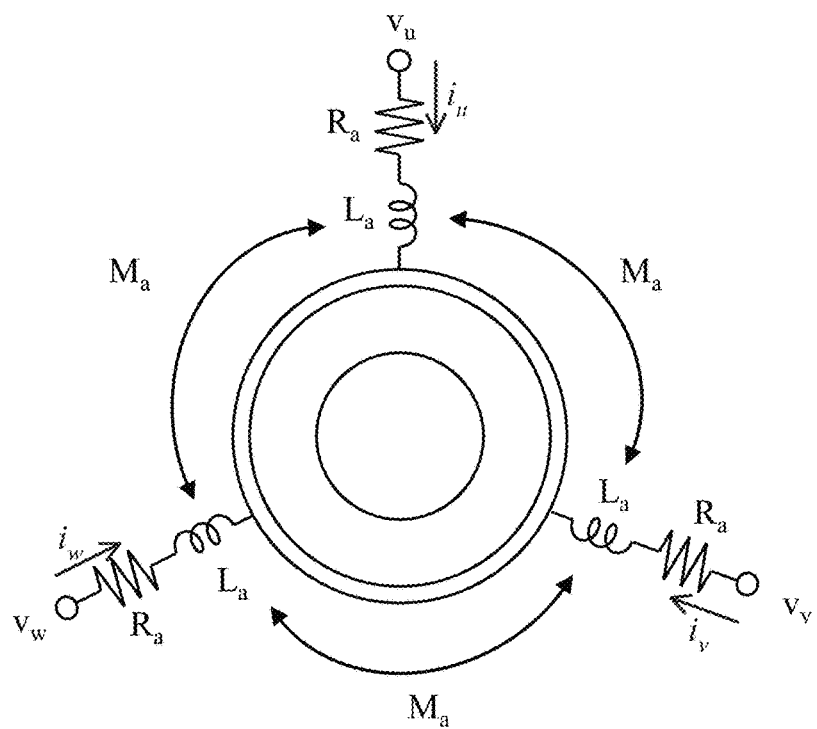
FIG. 7 is an electrical equivalent diagram showing a configuration example of a three-phase brushless motor.

At first, an equivalent configuration of a three-phase (a U-phase, a V-phase and a W-phase) brushless motor will be described with reference to FIG. 7. An armature winding resistance of respective phases and a self-inductance of the armature windings of the respective phases are represented as "Ra" and "La", respectively. The armature winding resistance Ra and the self-inductance La are connected in series and with an equal interval ($\pi/3$), and a mutual-inductance of the respective phases is represented as "Ma". Three phase voltages of the motor are presented as $V_u$, $V_v$ and $V_w$, three phase currents are presented as $i_u$, $i_v$ and $i_w$, and induced voltages (motor back-EMFs) that are induced in the three phase armature windings are presented as $e_u$, $e_v$ and $e_w$. A Laplace operator represents "s", and the three phase voltages $V_u$, $V_v$ and $V_w$ are represented by a following Equation 1.

$$\begin{bmatrix} V_u \\ V_v \\ V_w \end{bmatrix} = \begin{bmatrix} R_a + L_a s & -\frac{1}{2} M_a s & -\frac{1}{2} M_a s \\ -\frac{1}{2} M_a s & R_a + L_a s & -\frac{1}{2} M_a s \\ -\frac{1}{2} M_a s & -\frac{1}{2} M_a s & R_a + L_a s \end{bmatrix} \begin{bmatrix} i_u \\ i_v \\ i_w \end{bmatrix} + \begin{bmatrix} e_u \\ e_v \\ e_w \end{bmatrix} \quad \text{[Equation 1]}$$

The three-phase voltages $V_u$, $V_v$ and $V_w$ that are represented by the Equation 1 are nonlinear for the motor currents $i_u$, $i_v$ and $i_w$ of the three phases (U-phase, V-phase and W-phase), and the armature winding resistance Ra and the self-inductance La are linear elements. Thus, in order to linearize a relationship between the 3-phase voltages $V_u$, $V_v$ and $V_w$ and the motor currents $i_u$, $i_v$ and $i_w$ of the three phases, it is necessary to eliminate the motor back-EMEs $e_u$, $e_v$ and $e_w$ and the mutual inductance Ma that are nonlinear elements.

Figure 1:
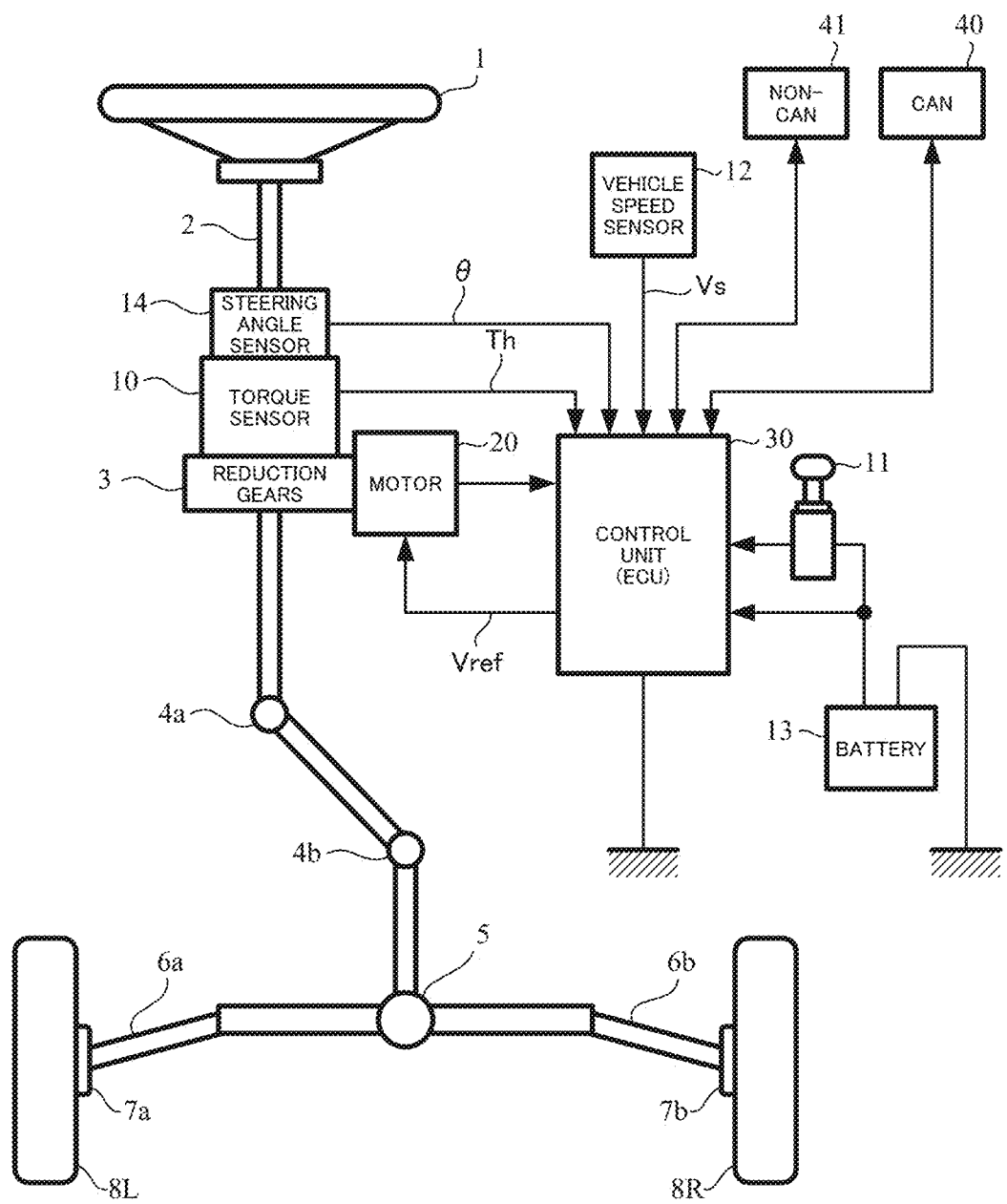
FIG. 1 is a configuration diagram showing a general outline of an electric power steering apparatus.
Figure 2:
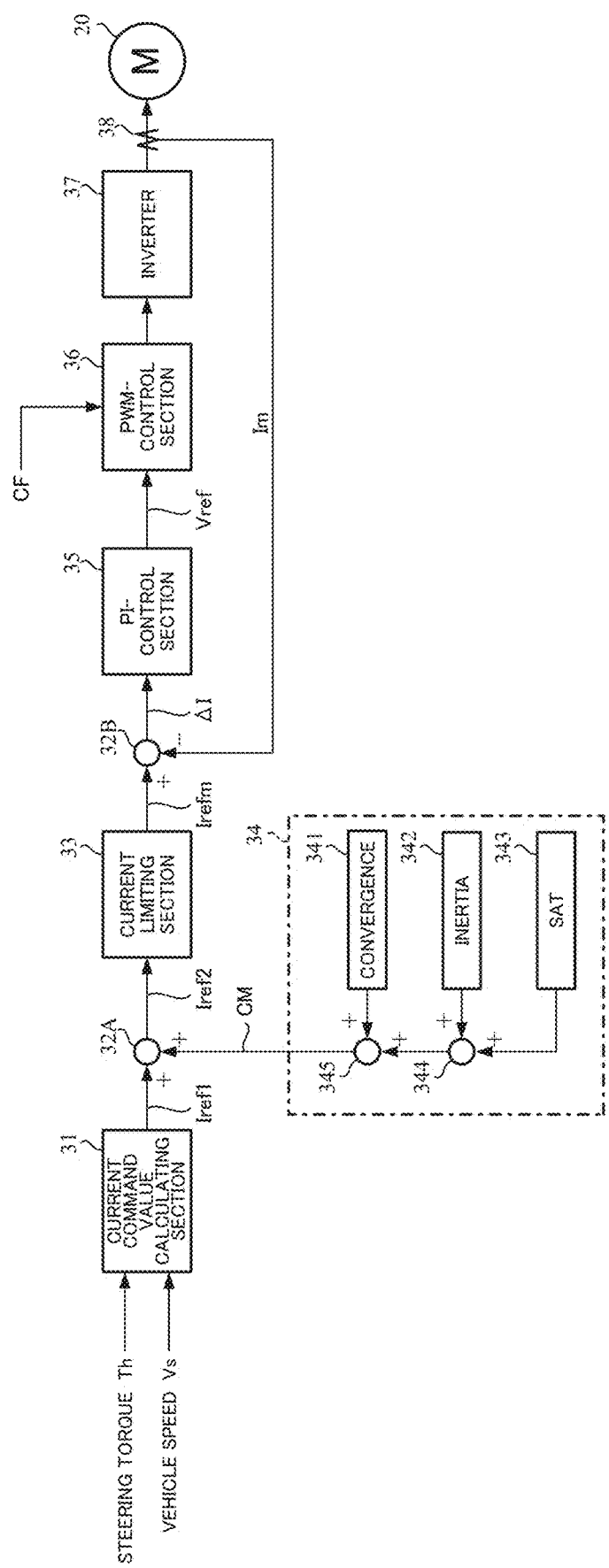
FIG. 2 is a block diagram showing a general configuration example of a control unit (ECU) of the electric power steering apparatus.
Figure 3:
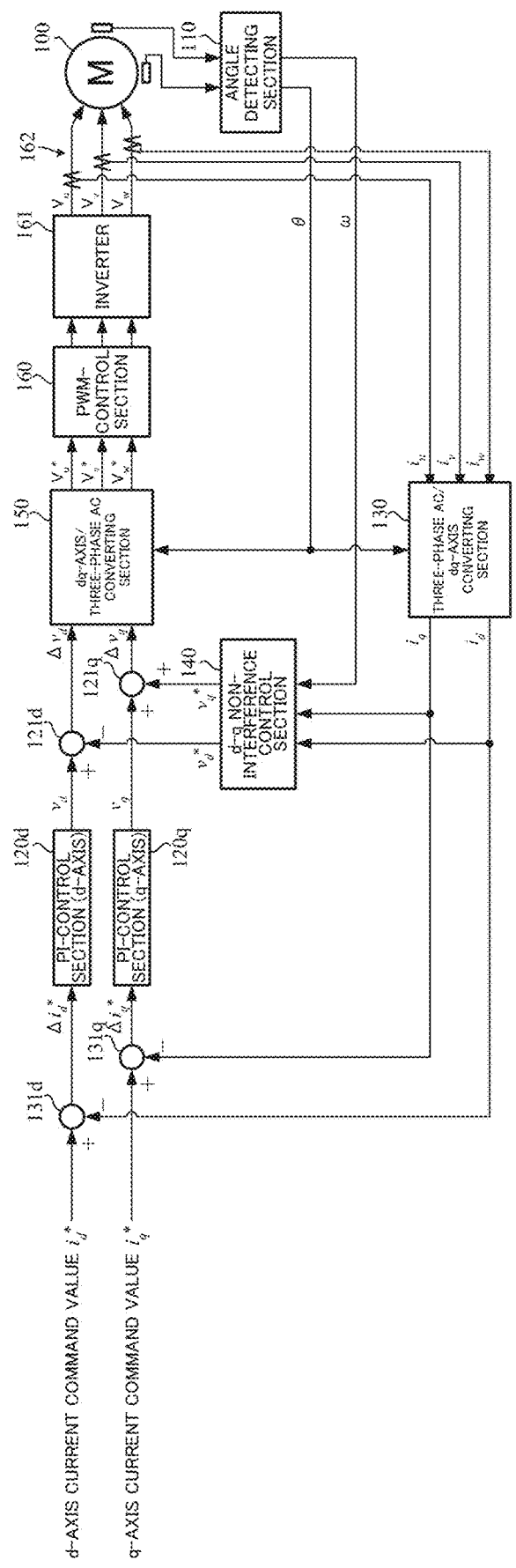
FIG. 3 is a block diagram showing a configuration example of a vector control method.
Figure 4:
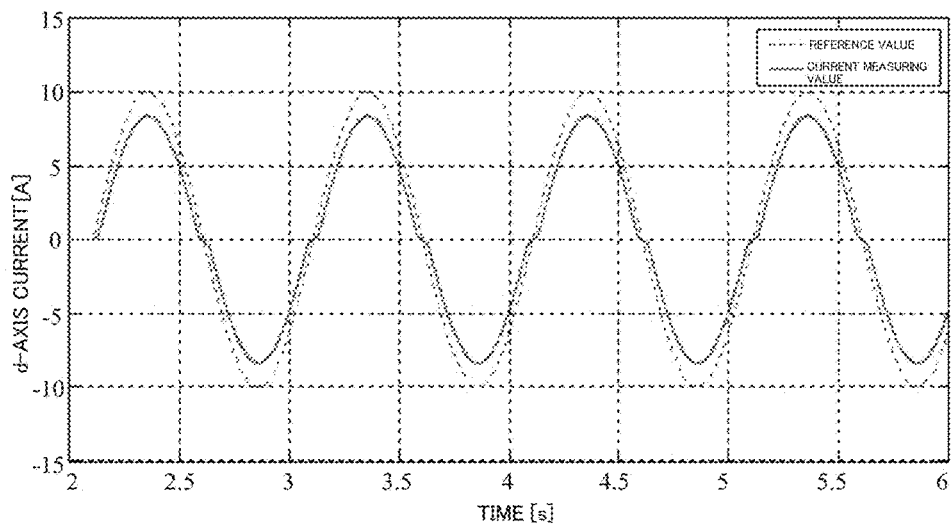
FIG. 4 is a graph showing a characteristic example (a reference value and a current measuring value) of conventional current control.
Figure 5:
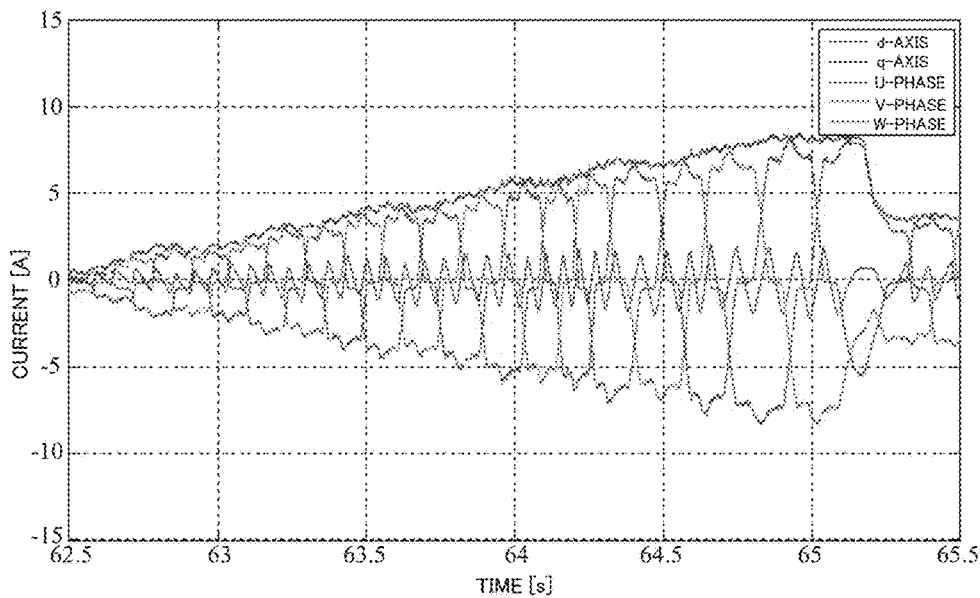
FIG. 5 is a graph showing a characteristic example (dq-axes and three phases) of the conventional current control.
Figure 6:
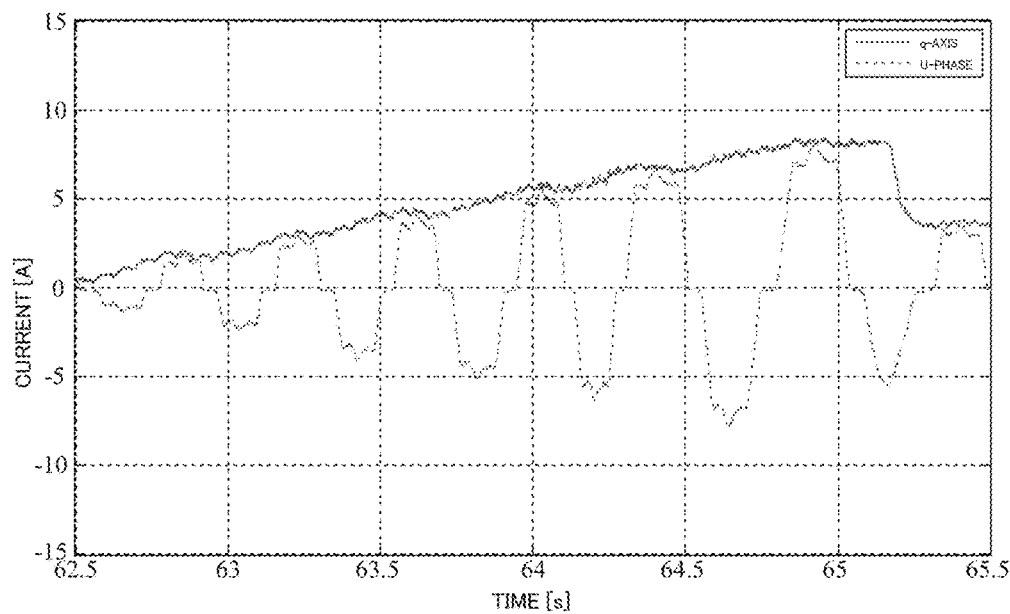
FIG. 6 is a graph showing a characteristic example (q-axis and a U-phase) of the conventional current control.

In the present invention, a whole that includes the inverter and the motor is considered to be a control object. In order to linearize an input from voltage command values $V_u^*$, $V_v^*$ and $V_w^*$ of the motor to the motor currents $i_u$, $i_v$ and $i_w$, a 3-phase disturbance observer to compensate the motor back-EMFs $e_u$, $e_v$ and $e_w$ and the mutual-inductance Ma considered as the disturbance, is disposed. A dead time of the inverter is compensated as the disturbance. Further, a spatial vector modulating section that performs an improvement of a voltage utilizing rate and an improvement in a characteristic of the dead time compensation is disposed. An overall configuration example of the present invention that the 3-phase disturbance observer is interposed in three-phase axes is shown in FIG. 8 corresponding to FIG. 3.

Figure 8:
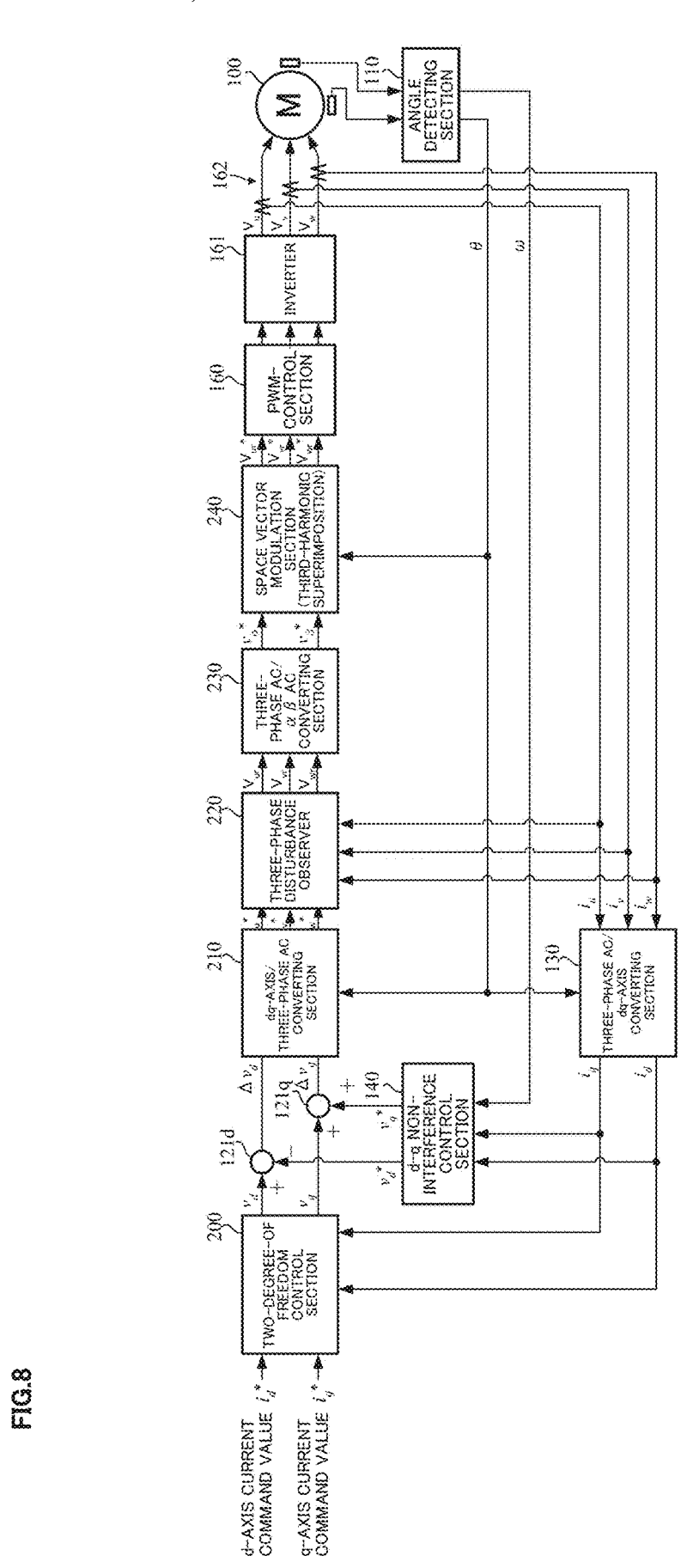
FIG. 8 is a block diagram showing a configuration example of a vector control system according to the present invention.

In FIG. 8, a d-axis current command value $i_d^*$ and a q-axis current command value $i_q^*$ that are calculated at a current command value calculating section (not shown) are inputted into a two-degree-of-freedom control section 200. A d-axis voltage command value $v_d$ and a q-axis voltage command value $v_q$ that are calculated at the two-degree-of-freedom control section 200 are inputted into a subtracting section 121d and an adding section 121q, respectively. Voltages $\Delta v_d$ and $\Delta v_q$ that are calculated at the subtracting section 121d and the adding section 121q are inputted into a dq-axes/3-phase alternative current (AC) converting section 210 that converts from two phases of the dq-axes to three phases of the U-phase, the V-phase and the W-phase. The 3-phase AC voltage command values $V_u^*$, $V_v^*$ and $V_w^*$ that are obtained at the dq-axes/3-phase AC converting section 210 are inputted into the 3-phase disturbance observer 220. Compensated voltage command values $V_{ur}$, $V_{vr}$ and $V_{wr}$ that are outputted from the 3-phase disturbance observer 220 are inputted into a 3-phase AC/$\alpha\beta$ AC converting section 230 that converts from the 3-phase voltage command values to a two-phase voltage command values in a α-β space, and are converted to the voltage command values $v_\alpha^*$ and $v_\beta^*$ in the α-β space. The voltage command values $v_\alpha^*$ and $v_\beta^*$ are inputted into the spatial vector modulating section 240 that superimposes third harmonic wave. The 3-phase voltage command values $V_{ur}^*$, $V_v$, and $V_{wu}^*$ that are vector-modulated at the spatial vector modulating section 240 are inputted into a PWM-control section 160. The motor 100 is driving-controlled through the PWM-control section 160 and the inverter 161 as described above.

A motor angle θ is inputted into the 3-phase AC/dq-axes converting section 130, the dq-axes/3-phase AC converting section 210 and the spatial vector modulating section 240. The motor currents $i_u$, $i_v$ and $i_w$ are inputted into the 3-phase AC/dq-axes converting section 130 and the 3-phase disturbance observer 220.

Figure 9:
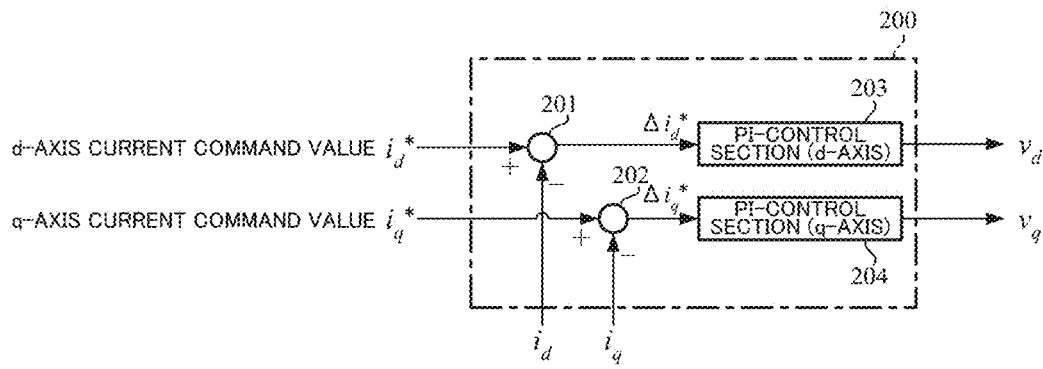
FIG. 9 is a block diagram showing a configuration example of a two-degree-of-freedom control section system.

As shown in FIG. 9, a configuration of the two-degree-of-freedom section 200 comprises the subtracting section 201 that calculates a current deviation $\Delta i_d^*$ by subtracting the d-axis feedback current $i_d$ from the d-axis current command value $i_d$, the subtracting section 202 that calculates a current deviation $\Delta i_q^*$ by subtracting the q-axis feedback current $i_q$ from the q-axis current command value $i_q^*$, the PI-control section 203 to PI-control the current deviation $\Delta i_d^*$, and the PI-control section 204 to PI-control the current deviation $\Delta i_q^*$.

The dq-axes/3-phase AC converting section 210 converts the dq-axes voltage deviations $\Delta v_d$ and $\Delta v_q$ to the 3-phase voltage command values $V_u^*$, $V_v^*$ and $V_w^*$ in accordance with the motor angle θ as a reference, and the 3-phase voltage command values $V_u^*$, $V_v^*$ and $V_w^*$ are inputted into the 3-phase disturbance observer 220.

Figure 10:
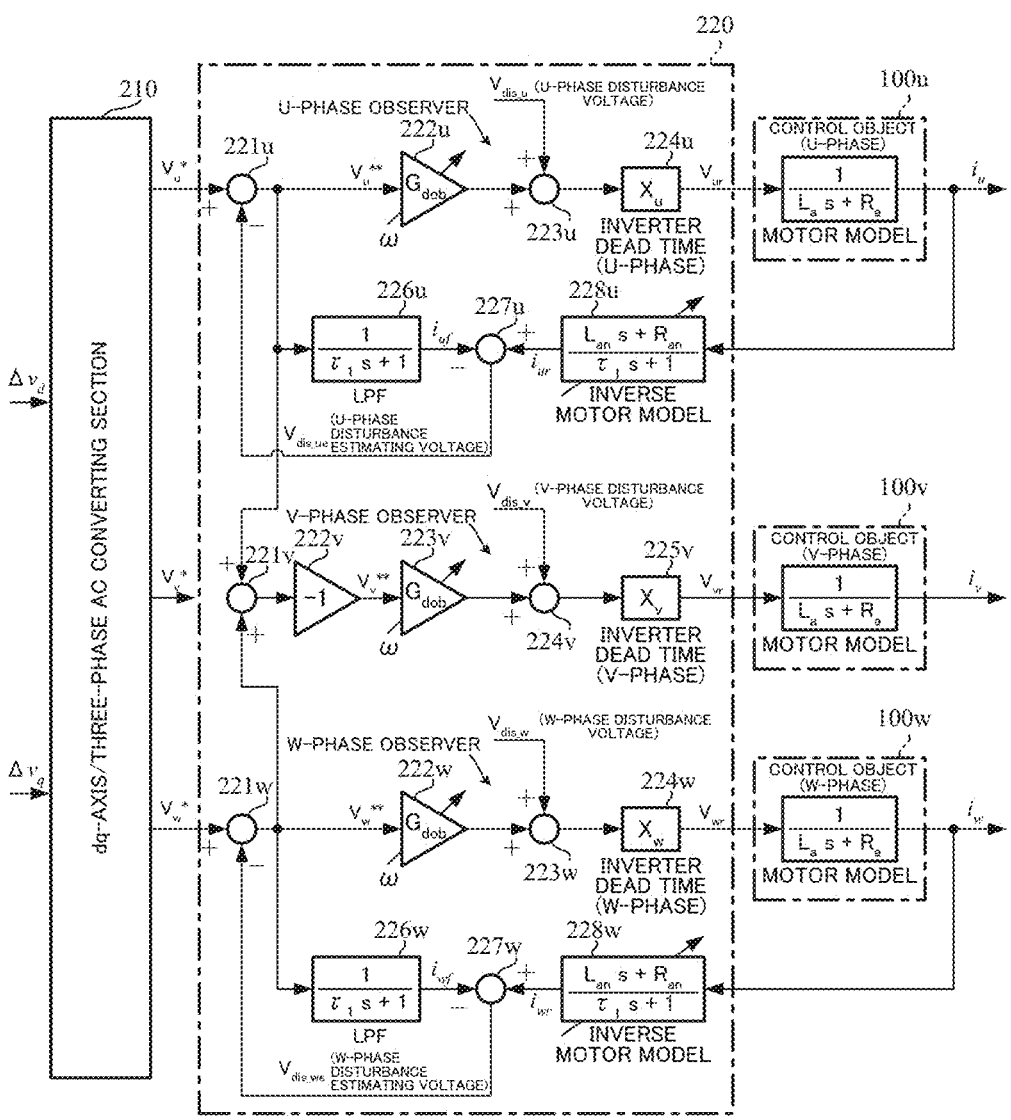
FIG. 10 is a block diagram showing a configuration example of a 3-phase disturbance observer (a two-phase type)
Figure 11:
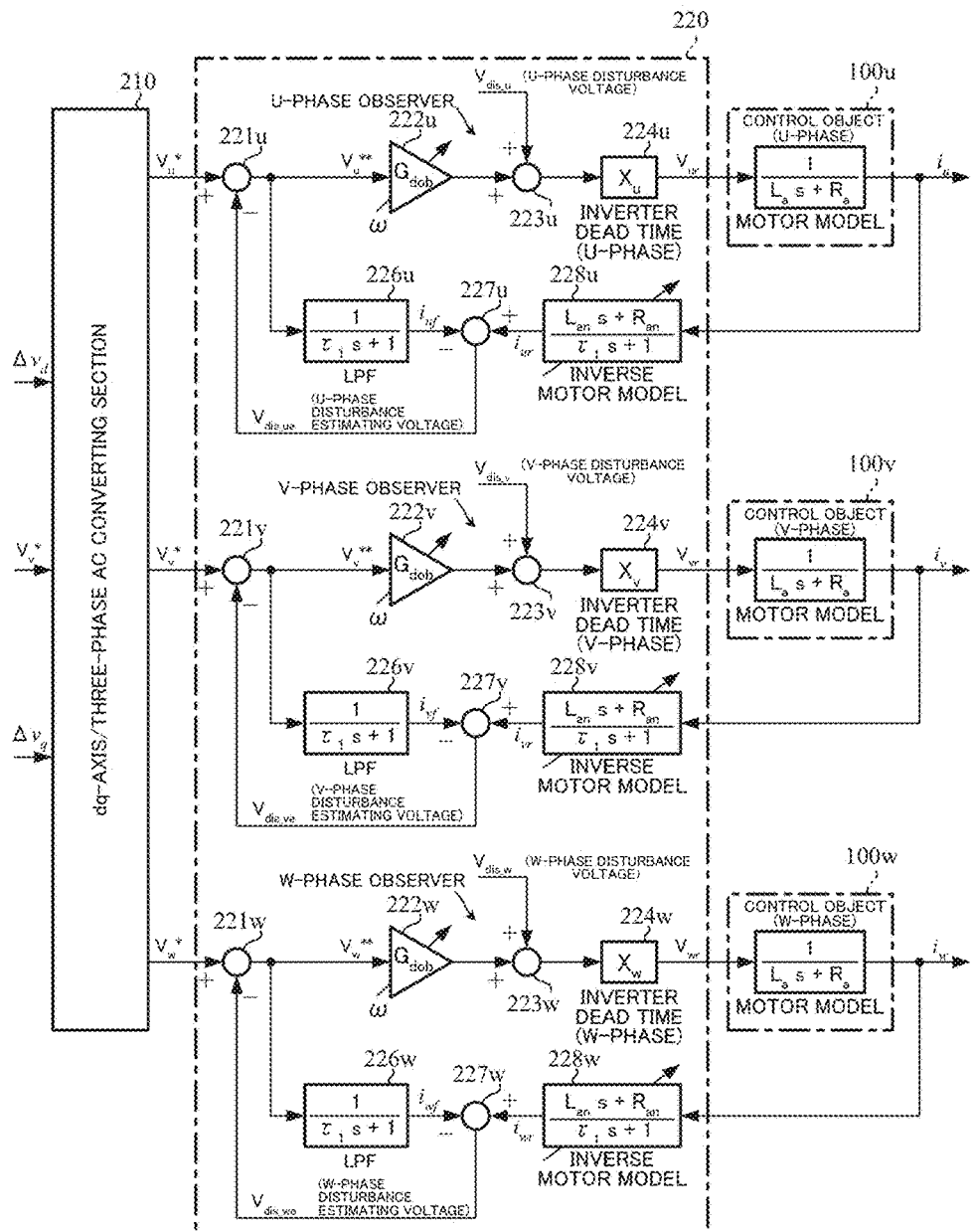
FIG. 11 is a block diagram showing a configuration example of the 3-phase disturbance observer (a three-phase type)

The 3-phase disturbance observer 220 has a configuration shown in FIG. 10 or FIG. 11. Since the current of the three-phase motor has a relationship "$i_u+i_v+i_w=0$" in FIG. 10, for example, the V-phase current can be calculated by "$i_v=-(i_u+i_w)$". The 3-phase disturbance observer 220 shown in FIG. 10 comprises a U-phase observer and a W-phase observer having the same configuration, and a V-phase observer being the other phase. That is, since the U-phase observer and the W-phase observer have the same configuration, only the U-phase observer will be described.

The voltage command value $V_u^*$ from the dq-axes/3-phase AC converting section 210 is inputted into a subtracting section 221u, and a deviation $V_u^{**}$ obtained by subtracting a U-phase disturbance estimating voltage $V_{dis\_ue}$ from the voltage command value $V_u^*$ is inputted into a gain section 222u and is multiplied by a gain $G_{dob}$ at the gain section 222u. The voltage multiplied by the gain $G_{dob}$ is inputted into an adding section 223u. The gain $G_{dob}$ of the gain section 222u is a characteristic in response to the motor rotational speed ω. A U-phase disturbance voltage $V_{dis\_u}$ such as an induced voltage that is induced in respective phase armature windings and an interference voltage due to the mutual-inductance between the windings is inputted into the adding section 223u. The added value is inputted into the motor model 225u that is a control object and is represented by a transfer function "1/(La·s+Ra)" via an inverter dead time (unknown model Xu) 224u. A U-phase current $i_u$ from the motor model 225u is inputted into an inverse motor model 228u that is represented by a transfer function "(Lan·s+Ran)/($\tau_1$·s+1)", and a current $i_{ur}$ from the inverse motor model 228u is adding-inputted into a subtracting section 227u.

Here, the "Ran" in the inverse motor model 228u is a nominal value of the armature winding resistance Ra, and the "Lan" is a nominal value of the self-inductance La. The voltage deviation $V_u^{**}$ is subtracting-inputted into the subtracting section 227u via a low pass filter (LPF) that is represented by a transfer function "1/($\tau_1$·s+1)", and the U-phase disturbance estimation voltage $V_{dis\_ue}$ that is calculated at the subtracting section 227u is subtracting-inputted into the subtracting section 221u.

The W-phase observer is the same configuration with the U-phase observer, the voltage deviation $V_u^{}$ from the subtracting section 221u and the voltage deviation $V_w^{}$ from the subtracting section 221w are inputted into an adding section 221v in a V-phase observer, the added result is inputted into an inverting section 222v that inverts the sign, and a voltage command value $V_v^{}$ that ($V_u^{}+V_w^{}$) is inverted is inputted into the gain section 223v. That is, the voltage command values $V_u^{}$, $V_v^{}$ and $V_w^{}$ have a relationship of the following Equation 2.

$$V_v^{}=-(V_u^{}+V_w^{**}) \quad \text{[Equation 2]}$$

The voltage from the gain section ($G_{dob}$) 223v is added to a V-phase disturbance voltage $V_{dis\_v}$ at the adding section 224v. The added voltage is inputted into the motor model 226v that is a control object and is represented by a transfer function "1/(La·s+Ra)" via the inverter dead time 225v. The gain $G_{dob}$ of the gain section 223v is changeable sensitive to the motor rotational speed ω.

The voltage command values $V_u^*$, $V_v$ and $V_w^*$ from the dq-axes/3-phase AC converting section 210 are considered as an input of the 3-phase disturbance observer 220, and together the respective phase disturbance voltages $v_{dis\_u}$, $v_{dis\_v}$ and $v_{dis\_w}$ and a modeling error of the control objects (a model including the inverter 161 and the motor 100) are estimated as the disturbance estimating voltages $v_{dis\_ue}$ and $v_{dis\_we}$. Then, by subtracting the disturbance estimating voltages $v_{dis\_ue}$ and $v_{dis\_we}$ from the respective phase voltage command values $V_u^*$ and $V_w^*$, it is possible to perform robust control. The modeling error includes the winding resistance error $\Delta R_a$, the self-inductance error $\Delta L_a$, and the unknown model (an error) $X_u$, $X_v$ and $X_w$ due to the dead time. A detail is described below.

In the 3-phase disturbance observer 220 of FIG. 10, although the control of the other phase performs from the phase observers with reference to the two phases by using a relationship of the Equation 2, the phase observers to the respective phases may be disposed as shown in FIG. 11.

In FIG. 11, the U-phase observer, the V-phase observer and the W-phase observer are respectively disposed to the U-phase, the V-phase and the W-phase, and they have the same configuration and the same operation with reference to the respective phases is performed.

As described above, the compensated voltage command values $V_{ur}$, $V_{vr}$ and $V_{wr}$ that the disturbance is compensated in the 3-phase disturbance observer 220, are inputted into the 3-phase AC/αβ AC converting section 230 to convert the 3-phase AC to an α-β space, the voltage command values $v_\alpha^*$ and $v_\beta^*$ being converted to the two-phases at the 3-phase AC/αβ AC converting section 230 are inputted into the spatial vector modulating section 240 with the motor angle θ.

Figure 12:
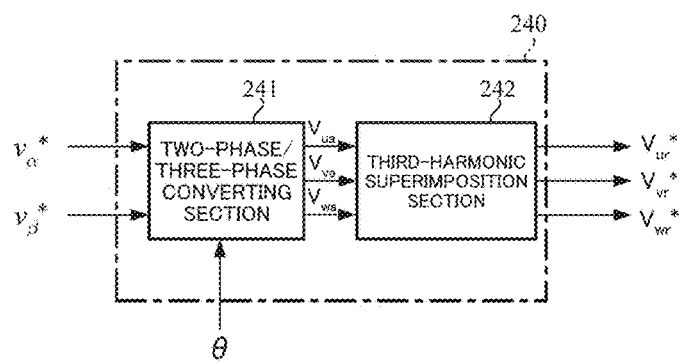
FIG. 12 is a block diagram showing a configuration example of a spatial vector modulating section.

As shown in FIG. 12, the configuration of the spatial vector modulating section 240 comprises a 2-phase/3-phase converting section 241 to convert the two-phase voltage command values $v_\alpha^*$ and $v\beta^*$ to the 3-phase voltages $V_{ur}$, $V_{vr}$ and $V_{wr}$, and a third-harmonic wave superimposition section 242 to superimpose the third harmonic wave on the 3-phase voltages $V_{ur}$, $V_{vr}$ and $V_{wr}$ and to outputs the voltage command values $V_{ur}^*$, $V_{vr}^*$ and $V_{wr}^*$. The motor rotational angle θ is inputted into the 2-phase/3-phase converting section 241. A detail of the spatial vector modulating section 240 is described hereinafter.

The error value between the armature winding resistance Ra and the nominal value Ran is defined as "$\Delta R_a$", and the error value between the self-inductance La and the nominal value Lan is defined as "$\Delta L_a$". In this case, the motor parameter that is the control object is represented by a following Equation 3.

$$R_a = R_{an} + \Delta R_a, L_a = L_{an} + \Delta L_{aa} \quad \text{[Equation 3]}$$

Further, voltage equations by the 3-phase disturbance observer 220 are represented by following Equations 4 to 6, and an Equation 7 is derived from the Equations 4 to 6. In the Equations 4 to 6, only the U-phase is described. Same equations are similarly satisfied in other phases.

$$v_{ur} + v_{dis\_u} = X_u(L_a S + R_a)i_u \quad \text{[Equation 4]}$$

$$v_{dis\_ue} = (L_{an}S + R_{an})i_u - v_{ur} \quad \text{[Equation 5]}$$

$$v_u^* - v_{dis\_ue} + v_{dis\_u} = X_u(L_a S + R_a)i_u \quad \text{[Equation 6]}$$

By using the Equation 3 to the Equation 5, the following Equation 7 is satisfied.

$$(L_{an}s + R_{an})i_u - v_{dis\_ue} + v_{dis\_u} = X_u((L_{an} + \Delta L_a)s + (R_{an} + \Delta R_a))i_u \quad \text{[Equation 7]}$$

A filter time constant is defined as "$\tau_1$", and the LPFs 226u to 226w having the transfer function "$1/(\tau_1 \cdot s + 1)$" are respectively filters of to limit a band of the disturbance observer 220. The performance of the disturbance observer 220 is well exerted in the frequency region that is lower than a cut-off frequency of the LPFs 226u to 226w. When the voltage equations are solved by limiting to only the frequency region that is lower than the cut-off frequency, a following Equation 8 is obtained. Any one of the gain $G_{dob}$ of the gain sections 222u to 222w is changeable in response to the motor rotational speed ω. Here, for simplification, the gain $G_{dob}$ is set to "1" ($G_{dob}$=1). By using the Equation 3, 6 and 7, the following Equation 8 is satisfied.

$$v_u^* = (L_{an}s + R_{an})i_u \quad \text{[Equation 8]}$$

The Equation 8 denotes that it can be linearized from the voltage command value $V_u^*$ to the current value $i_u$. In such a way, by utilizing the 3-phase disturbance observer 220, it is possible to reduce the induced voltage of the armature current, the interference voltage due to the mutual-inductance, the modeling error of the winding resistance of the motor and the self-inductance, and the unknown errors $X_u$, $X_v$ and $X_w$ of the inverter. Apparently, the circuit equation of the three-phase brushless motor is transformed from the above Equation 1 to a following Equation 9.

$$\begin{bmatrix} V_u \\ V_v \\ V_w \end{bmatrix} = \begin{bmatrix} R_{an} + L_{an}s & 0 & 0 \\ 0 & R_{an} + L_{an}s & 0 \\ 0 & 0 & R_{an} + L_{an}s \end{bmatrix} \begin{bmatrix} i_u \\ i_v \\ i_w \end{bmatrix} \quad \text{[Equation 9]}$$

Figure 13:
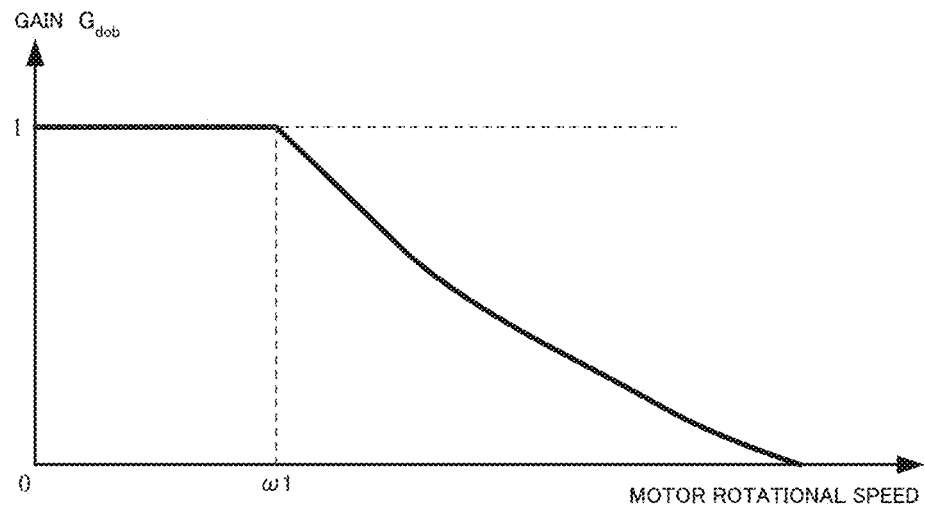
FIG. 13 is a graph showing a characteristic example of a gain section.

The gain $G_{dob}$ of the gain sections 222u to 222w is a changeable gain in response to the motor rotational speed ω. Generally, since the battery is used to the power supply voltage of the electric power steering apparatus, the power supply voltage of the electric power steering apparatus is about 12[V]. When the duty is saturated in the high speed rotational region of the motor 100, the noisy sound is occurred. Thus, as shown in FIG. 13, the gain $G_{dob}$ is adjusted so that the back-EMF is not excessively compensated by the 3-phase disturbance observer 220. That is, the gain $G_{dob}$ is set to "1" when the rotational speed ω of the motor (an absolute value) is equal to or less than a predetermined value ω1, and the gain $G_{dob}$ gradually decreases when the rotational speed ω of the motor is more than the predetermined value ω1. In a case that the 3-phase disturbance observer 220 is effective in an overall steering region, the gain $G_{dob}$ is always set to "1".

Figure 14:
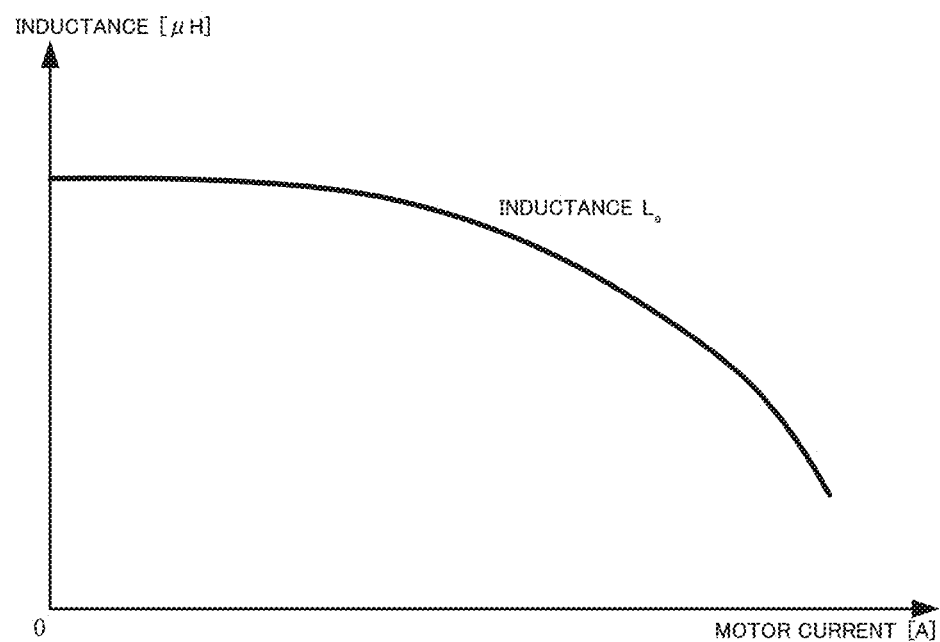
FIG. 14 is a graph showing a characteristic example of an inductance of a motor.

As shown in FIG. 14, when the motor current increases, the self-inductance $L_a$ of the motor gradually decreases due to an influence of the magnetic saturation. The 3-phase disturbance observer 220 of the present invention can change the inductance $L_a$ ($L_{an}$) of the motor inverse models 228u to 228w in sensitive to the motor current, and can reduce the current distortion. However, the inductance $L_a$ ($L_{an}$) is not changeable and may be set to a fixed value.

Here, it is explained that the phase observer is not affected from the disturbance voltage and the inverter dead time. Although the explanation is used by using the U-phase, this is similarly applicable to the V-phase and the W-phase and also to FIG. 10 and FIG. 11. The explanation is performed as "Lan=La" and "Ran=Ra".

The motor current $i_u$ that is the output of the motor model 225u is represented by a following Equation 10.

$$i_u = \frac{1}{R_a + sL_a}(V_u^{**} \cdot G_{dob} + V_{dis\_u} \cdot X_u - V_{dis\_ue}) \quad \text{[Equation 10]}$$

The disturbance estimating value $V_{dis\_ue}$ that is outputted from the subtracting section 227u of the U-phase observer 227u is represented by a following Equation 11.

$$\begin{aligned} V_{dis\_ue} &= \frac{R_a + sL_a}{1 + s\tau_1} i_u - \frac{1}{1 + s\tau_1}(V_u^{} \cdot G_{dob} - V_{dis\_ue}) \\ &= \frac{R_a + sL_a}{1 + s\tau_1} \cdot \frac{1}{R_a + sL_a}\left(\frac{V_u^{} \cdot G_{dob} + V_{dis\_u} \cdot}{X_u - V_{dis\_ue}}\right) - \\ &\quad \frac{1}{1 + s\tau_1}(V_u^{} \cdot G_{dob} - V_{dis\_ue}) \\ &= \frac{1}{1 + s\tau_1}\left(\begin{array}{c} V_u^{} \cdot G_{dob} + V_{dis\_u} \cdot X_u - \\ V_{dis\_ue} - V_u^{**} \cdot G_{dob} + V_{dis\_ue} \end{array}\right) \\ &= \frac{1}{1 + s\tau_1} V_{dis\_u} \cdot X_u \end{aligned} \quad \text{[Equation 11]}$$

That is, the motor current $i_u$ is passed through the inverse motor model 228u, and the output $i_{ur}$ is represented by a following Equation 12.

$$i_{ur} = (V_u^{**} \cdot G_{dob} - V_{dis\_ue} + V_{dis\_u} \cdot X_u)/(\tau_1 \cdot s + 1) \quad \text{[Equation 12]}$$

The input of the LPF 226u is "Vu**=$V_u^* - V_{dis\_ue}$", and the output $i_{uf}$ is represented by a following Equation 13.

$$i_{uf} = (V_u^* - V_{dis\_ue})/(\tau_1 \cdot s + 1) \quad \text{[Equation 13]}$$

Therefore, the disturbance estimating voltage $V_{dis\_ue}$ that is the output of the subtracting section 227u is represented by the above Equation 11.

Here, by substituting the Equation 11 for the Equation 10, a following Equation 14 is established.

$$i_u = \frac{1}{R_a + sL_a}(V_u^{**} \cdot G_{dob} + V_{dis\_u} \cdot X_u - V_{dis\_ue}) \quad \text{[Equation 14]}$$

-continued $$= \frac{1}{R_a + sL_a}\left(V_u^{**} \cdot G_{dob} + V_{dis\_u} \cdot X_u - \frac{1}{1+s\tau_1}V_{dis\_u} \cdot X_u\right)$$

$$= \frac{1}{R_a + sL_a}\left(V_u^{**} \cdot G_{dob} + \frac{1+s\tau_1 - 1}{1+s\tau_1}V_{dis\_u} \cdot X_u\right)$$

$$= \frac{1}{R_a + sL_a}\left(V_u^{**} \cdot G_{dob} + \frac{s\tau_1}{1+s\tau_1}V_{dis\_u} \cdot X_u\right)$$

$$= \frac{1}{R_a} \cdot \frac{1}{1+s\frac{L_a}{R_a}}\left(V_u^{**} \cdot G_{dob} + \frac{s\tau_1}{1+s\tau_1}V_{dis\_u} \cdot X_u\right)$$

$$= \frac{1}{R_a} \cdot \frac{1}{1+s\tau}\left(V_u^{**} \cdot G_{dob} + \frac{s\tau_1}{1+s\tau_1}V_{dis\_u} \cdot X_u\right)$$

where, a time constant $\tau$ is equal to "La/Ra" (T=La/Ra).

Figure 15:
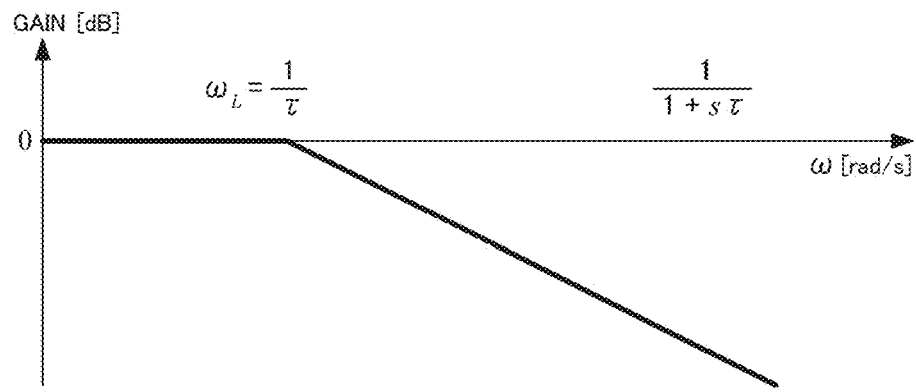
FIG. 15 is a graph showing a characteristic example of a phase disturbance observer (a low pass filter (LPF))
Figure 16:
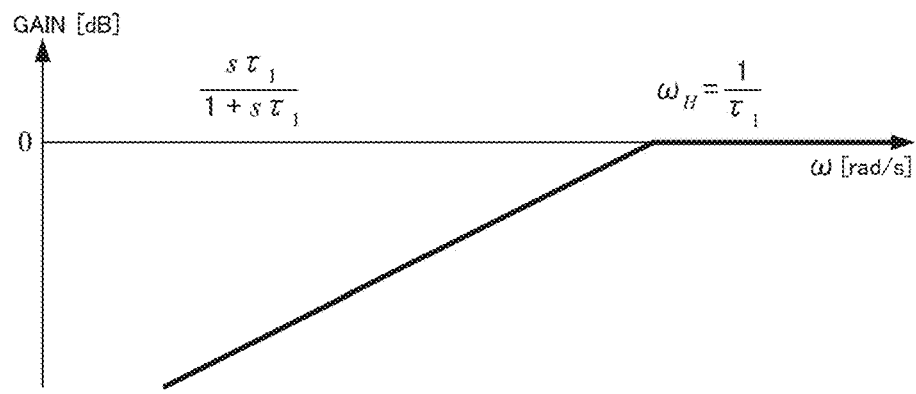
FIG. 16 is a graph showing a characteristic example of the phase disturbance observer (LPF)

Here, FIG. 15 shows an angle frequency characteristic of the transfer function "$1/(1+s\cdot\tau)$" ("$\tau$" is the time constant of the motor winding), and FIG. 16 shows the angle frequency characteristic of the transfer function "$s\cdot\tau_1/(1+s\cdot\tau_1)$". In the transfer function "$G_H(s)=s\cdot\tau_1/(1+s\cdot\tau_1)$" of FIG. 16, when the angle frequency $\omega$ is sufficiently smaller than a cut-off frequency $\omega_H$, that is, a relationship "$\omega<<\omega_H$" is satisfied, the transfer function $G_H(s)$ is approximated by an Equation 15.

$$G_H(s) = \frac{s\tau_1}{1+s\tau_1} \approx 0 \qquad \text{[Equation 15]}$$

When the above relationship is applied to the Equation 14, and a following Equation 16 is satisfied. The output current $i_u$ is not affected by the disturbance $V_{dis\_u}$ and the dead time Xu.

$$i_u = \frac{1}{R_a} \cdot \frac{1}{1+s\tau}V_u^{**} \cdot G_{dob} \qquad \text{[Equation 16]}$$

As well, a relationship between the time constant $\tau$ of the motor winding and the filter time constant $\tau_1$ of the U-phase observer needs to satisfy a below Equation 17.

$$\frac{1}{\tau} << \frac{1}{\tau_1} \qquad \text{[Equation 17]}$$

That is, a following relationship is needed to be satisfied.

$$\tau >> \tau_1 \qquad \text{[Equation 18]}$$

Next, the spatial vector modulation will be described. All the spatial vector modulating section 240 having functions have a function that converts 2-phase voltages ($v_\alpha^*$, $v_\beta^*$) on the α-β space into 3-phase voltages (Vua, Vva, Vwa) and a third harmonic waveformto the 3-phase voltages (Vua, Vva, Vwa) as shown in FIG. 12. For example, the spatial vector modulating methods proposed in Japanese Publication Unexamined Patent No. 2017-70066, WO/2017/098840 (Japanese Patent Application No. 2015-239898) and so on by the present applicant may be used.

Figure 17:
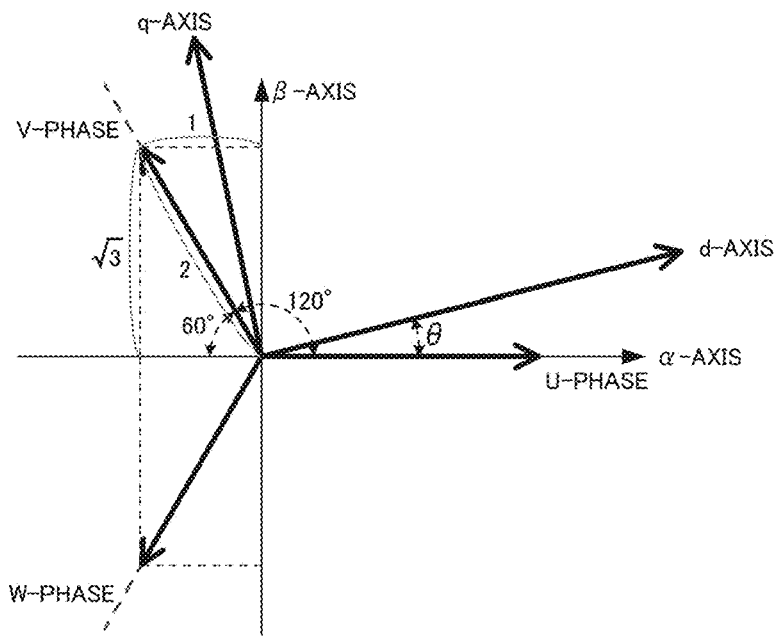
FIG. 17 is a graph showing an operation example of a spatial vector modulating section.

That is, the spatial vector modulation performs the below coordinate transformation based on the voltage command values $v_\alpha^*$ and $v_\beta^*$ of the α-β space, the motor rotational angle θ and a sector number n (#1 to #6), and controls ON/OFF of the FETs (an upper-arm Q1, Q3, Q5; a lower-arm Q2, Q4, Q6) of the bridge type inverter. By supplying switching patterns S1 to S6 corresponding to the sectors #1 to #6 to the motor, it has a function to control the rotation of the motor. Regarding the coordinate transformation, in the spatial vector modulation, the voltage command values $v_\alpha^*$ and $v_\beta^*$ are coordinate-transformed to voltage vectors Vα and Vβ on an α-β coordinate system based on the below Equation 19. A relation between the coordinate axis and the motor rotational angle θ used in the above coordinate transformation, is shown in FIG. 17.

$$\begin{bmatrix} V\alpha \\ V\beta \end{bmatrix} = \begin{bmatrix} \cos\theta & -\sin\theta \\ \sin\theta & \cos\theta \end{bmatrix}\begin{bmatrix} v_\alpha^* \\ v_\beta^* \end{bmatrix} \qquad \text{(Equation 19)}$$

There is a relation expressed by the below Equation 20 between the target voltage vector on the d-q coordinate system and the a target voltage vector on the α-β coordinate system, and an absolute value of the target voltage vector V is held.

$$|V| = \sqrt{(v_\alpha)^{*2}+(v_\beta)^2} = \sqrt{V\alpha^2+V\beta^2} \qquad \text{(Equation 20)}$$

Figure 18:
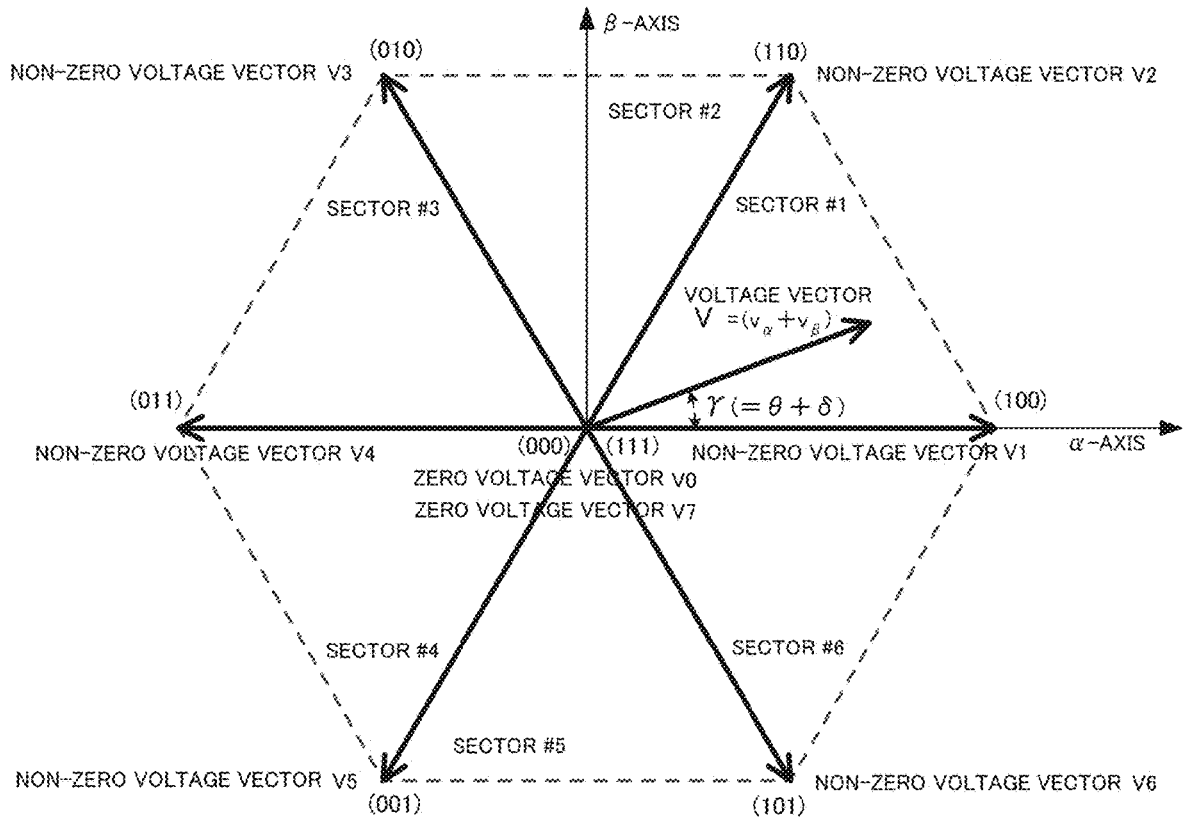
FIG. 18 is a graph showing an operation example of the spatial vector modulating section.

In the switching patterns of the spatial vector control, the output voltages of the inverter are defined with 8-kinds discrete reference output voltage vectors V0 to V7 (non-zerovoltage vectors V1 to V6 of which phases are different by π/3 [rad] and zero voltage vectors V0, V7) shown in the spatial vector diagram of FIG. 18 corresponding to the switching patterns S1 to S6 of the FETs (Q1 to Q6). The selection of the reference output voltage vectors V0 to V7 and the occurrence time thereof are controlled. It is possible to divide the spatial vectors into the six sectors #1 to #6 by using six regions sandwiched with adjacent reference output voltage vectors. The target voltage vector belongs to any one of the sectors #1 to #6, and it is possible to allot the sector number. It is possible to obtain based on the rotational angle γ in the α-β coordinate system of the target voltage vector V that the target voltage vector V being the synthetic vector of Vα and Vβ exists any one of the sectors shown in FIG. 18 sectioned to the regular hexagonal shape in the α-β space. The rotational angle γ is determined by "γ=θ+δ" as an addition of the phase 5 obtained from a relation between the motor rotational angle θ and the voltage command values $v_\alpha^*$ and $v_\beta^*$ in the d-q coordinate system.

Figure 19:
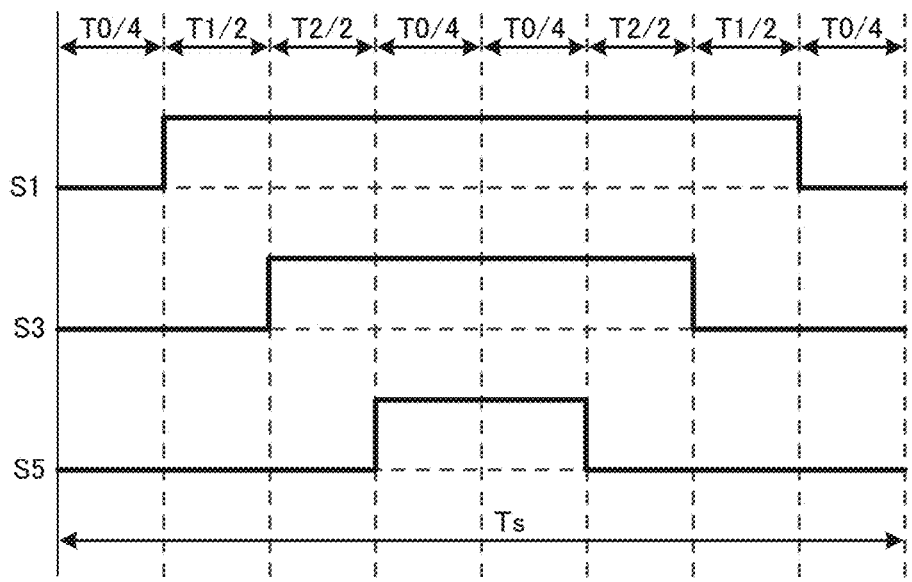
FIG. 19 is a timing chart showing an operation example of the spatial vector modulating section.

FIG. 19 shows a basic timing chart to determine, with the digital control due to the switching patterns S1, S3, S5 of the inverter in the spatial vector control, the switching pulse width and the timing in ON/OFF signals S1 to S6 (switching patterns) for the FETs in order to output the target voltage vector V from the inverter. The spatial vector modulation performs the calculation and the like at a every prescribed sampling term Ts within the sampling term Ts, and converts the calculated result into the respective switching pulse widths and the timings of the switching patterns S1 to S6 at a next sampling term Ts and then outputs.

The spatial vector modulation generates the switching patterns S1 to S6 corresponding to the sector numbers obtained based on the target voltage vector V. In FIG. 19, an example of the witching patterns S1 to S6 of the FETs of the inverter in a case of the sector number #1 (n=1) is shown. The signals S1, S3, S5 indicate gate signals of the FETs Q1, Q3, Q5 corresponding to the upper-arm. The horizontal axis is a time, and "Ts" corresponds to a switching period and is divided into 8-periods comprising T0/4, T1/2, T2/2, T0/4, T0/4, T2/2, T1/2 and T0/4. The terms T1 and T2 are respectively times depending on the sector number n and rotational angel γ.

Figure 20:
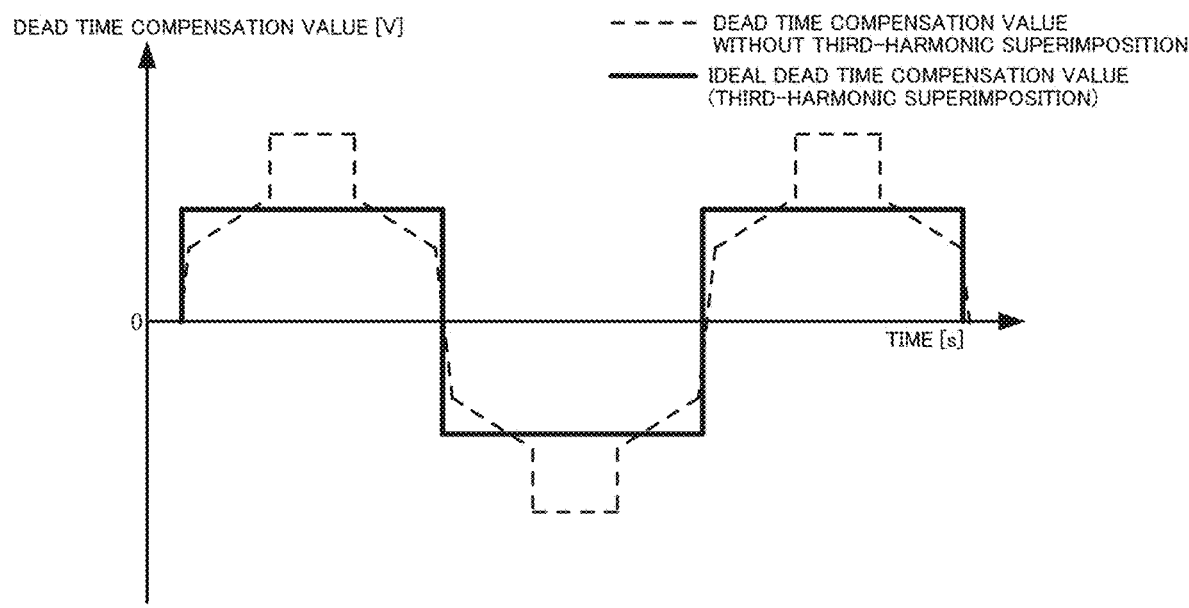
FIG. 20 is a graph showing an effect of the spatial vector modulation.

In a case that there is no the spatial vector modulation, the dead time compensation value waveform (the U-phase waveform) that dead time compensation of the present invention is applied on the dq-axes and only the dead time compensation values are dq-axes/3-phase-converted, is a waveform removed the third harmonic component as shown by a dashed-line in FIG. 20. The V-phase and the W-phase are also same. By adopting the spatial vector modulation instead of the dq-axes/3-phase conversion, it is possible to superpose the third harmonic wave to 3-phase signals and further to make up for the third harmonic component being wanting due to the 3-phase conversion. Thereby, it is possible to generate the ideal dead time compensation waveform as shown by a real line of FIG. 20.

Figure 21:
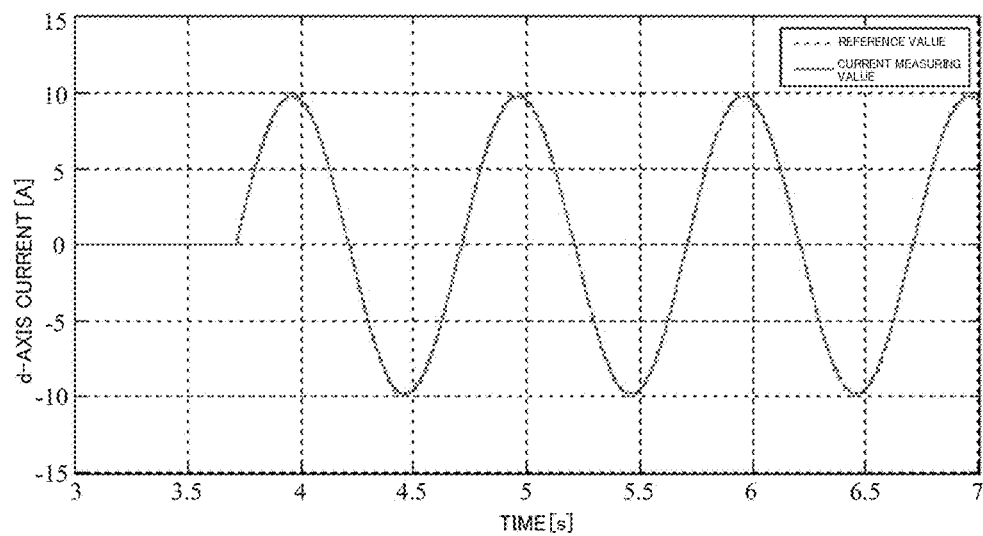
FIG. 21 is a graph showing a characteristic example (a reference value and a current measuring value) of current control of the present invention.
Figure 22:
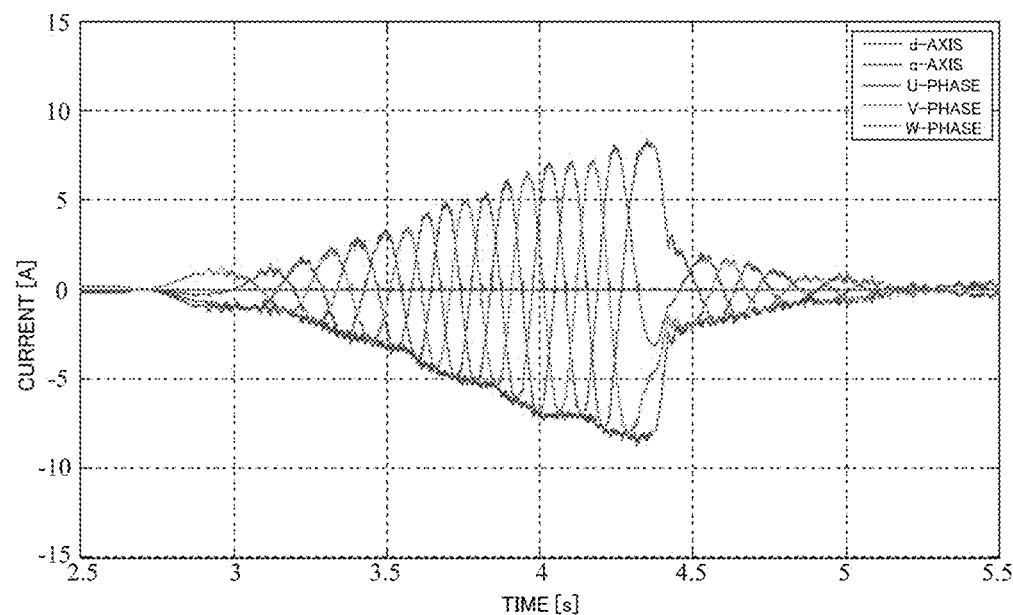
FIG. 22 is a graph showing a characteristic example (dq-axes and three phases) of the current control of the present invention.
Figure 23:
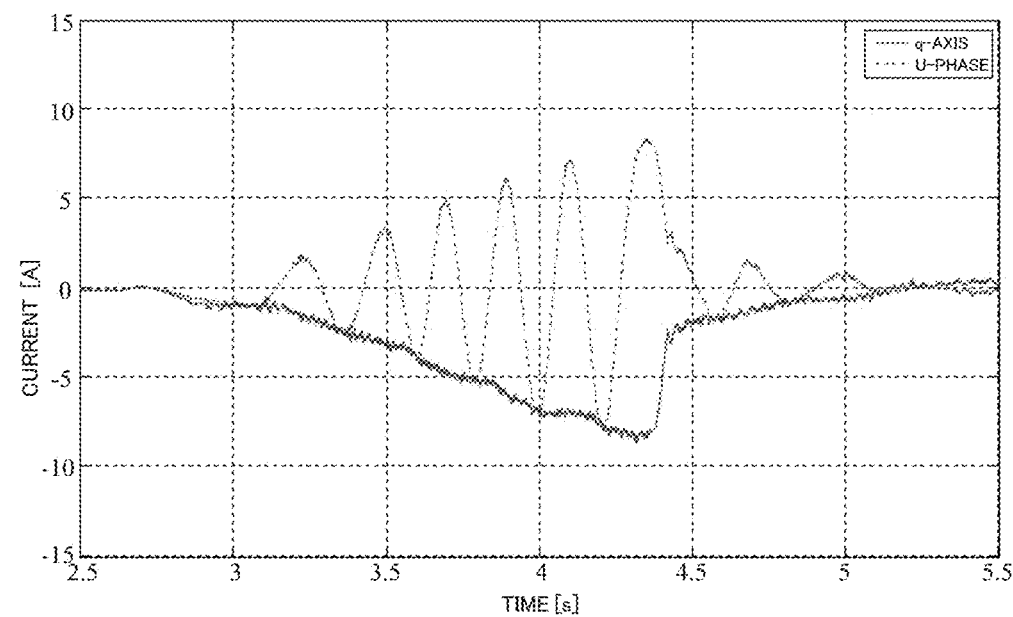
FIG. 23 is a graph showing a characteristic example (q-axis and a U-phase) of the current control of the present invention.

In a case that the 3-phase disturbance observer and the space vector modulation are operated, FIG. 21 is a result when the sinusoidal wave is inputted into the d-axis current command value. In comparison with the case that the 3-phase disturbance observer is not existed, the waveform distortions of the d-axis current value and the 3-phase current values are reduced, and the error is not almost generated. Showing the motor current when the handle is slowly steered from a straight travelling state (an on-center state), as shown in FIG. 22 and FIG. 23, it is understood that the distortions of the phase currents are improved, and the vibration and the ripple of the q-axis current (the torque) are reduced.

By implementing an automatic model identification algorithm of the motor and changing a motor reference model of the 3-phase-axes disturbance observer, plural kinds of the motors can be operated by the same control. Further, it is also possible to change the motor reference model of the disturbance observer of the 3-phase-axes and the parameters of the two-degree-of-freedom sensitive to the motor current. If the current of the motor increases, the inductance $L_a$ of the motor varies due to the magnetic saturation phenomenon. In the above cases, the inductance nominal value $L_{an}$ by the disturbance observer is explained as a fixed value. However, when the inductance nominal value $L_{an}$ of the observer is not changed corresponding to the inductance of the motor, the waveform is distorted and the ripple is generated. Consequently, if the inductance nominal value $L_{an}$ of the observer is changeable sensitive to the motor current, it is possible to improve the distortion of the waveform and the ripple.

The limit value of the compensation value of the 3-phase disturbance observer in the motor current control is changeable depending on the power supply voltage of the inverter. Since the disturbance observer compensates all of the disturbances such as the back-EMF and the dead time, the region that is overcompensated is existed. For example, since the back-EMF is large in a case of the electric power steering apparatus, the overcompensation of the disturbance observer increases, the duty is saturated, and the noisy sound and the vibration are generated. In a case that the power supply voltage of the inverter is high, since it is difficult to saturate the duty, the limit value after the compensation can be larger. However, in a case that the power supply voltage of the inverter is low, it is necessary that the limit value is small.

EXPLANATION OF REFERENCE NUMERALS 1 handle
2 column shaft (steering shaft, handle shaft)
10 torque sensor
12 vehicle speed sensor
13 battery
20, 100 motor
30 control unit (ECU)
31 current command value calculating section
35, 203, 204 PI-control section
36, 160 PWM-control section
37, 161 inverter
110 angle detecting section
130 3-phase AC/dq-axes converting section
140 d-q non-interference control section
200 two-degree-of-freedom control section
210 dq-axes/3-phase AC converting section
220 3-phase disturbance observer
230 3-phase AC/αβ AC converting section
240 spatial vector modulating section
241 2-phase/3-phase converting section
242 third-harmonic wave superimposition section

The invention claimed is:

1. An electric power steering apparatus that driving-controls a three-phase brushless motor which applies an assist torque to a steering mechanism of a vehicle by using a current command value calculated based on at least a steering torque, and vector-controls said three-phase brushless motor by using dq-axes command values that are converted from said current command value via an inverter, comprising:
   a three-phase disturbance observer to compensate respective phase disturbance voltages, which include a dead time of said inverter, for 3-phase voltage command values,
   wherein said 3-phase disturbance observer includes phase observer sections comprising a motor model, an inverse motor model and a low pass filter for each of three phases, and
   wherein said phase observer sections comprise:
   a first subtracting section to subtract a disturbance estimation voltage from a phase voltage that is converted into three phases;
   a gain section to multiply a subtraction value from said first subtracting section by a gain;
   said motor model to input a phase voltage that adds a disturbance element to an output of said gain section, and to output a phase current;
   said inverse motor model to input said phase current;
   said low pass filter to input said subtraction value; and
   a second subtracting section to subtract an output of said low pass filter from an output of said inverse motor model, and to output said disturbance estimation voltage.

2. The electric power steering apparatus according to claim 1, wherein a gain of said gain section is changeable depending on a motor rotational speed.

3. The electric power steering apparatus according to claim 1, wherein a compensation value of said 3-phase disturbance observer is changeable depending on a power supply voltage of said inverter.

4. The electric power steering apparatus according to claim 1, wherein an inductance nominal value of said 3-phase disturbance observer is changeable depending on a current of said three-phase brushless motor.

5. The electric power steering apparatus according to claim 1, wherein a spatial vector modulating section that superimposes a third harmonic wave is disposed at a subsequent stage of said 3-phase disturbance observer.

6. An electric power steering apparatus that driving-controls a three-phase brushless motor which applies an assist torque to a steering mechanism of a vehicle by using a current command value calculated based on at least a steering torque, and vector-controls said three-phase brushless motor by using dq-axes command values that are converted from said current command value via an inverter, comprising:

a three-phase disturbance observer to compensate respective phase disturbance voltages, which include a dead time of said inverter, for three-phase voltage command values,
  wherein said three-phase disturbance observer comprises:
  phase observer sections comprising a motor model; an inverse motor model and a low pass filter for two phases among said three phases; and
  an other-phase observer section, for an other phase among said three phases, comprising a motor model for an inverted phase voltage obtained by adding two phase voltages among said three phases and by inverting a sign of an added phase voltage.

7. The electric power steering apparatus according to claim 6, wherein said phase observer sections comprise:
  a first subtracting section to subtract a disturbance estimation voltage from a phase voltage that is converted into three phases;
  a first gain section to multiply a subtraction value from said first subtracting section by a gain,
  a first motor model to input a phase voltage that adds a disturbance element to an output of said first gain section, and to output a phase current;
  said inverse motor model to input said phase current;
  said low pass filter to input said subtraction value; and
  a second subtracting section to subtract an output of said low pass filter from an output of said inverse motor model, and to output said disturbance estimation voltage, and
  wherein said other-phase observer section comprises:
  an adding section to add two phase voltages among said converted three phase voltages;
  an inverting section to invert a sign of an output of said adding section;
  a second gain section to multiply an output of said inverting section by a gain; and
  a second motor model to input a phase voltage that adds a disturbance element to an output of said second gain section, and to output a phase current.

8. The electric power steering apparatus according to claim 6, wherein a compensation value of said 3-phase disturbance observer is changeable depending on a power supply voltage of said inverter.

9. The electric power steering apparatus according to claim 6, wherein an inductance nominal value of said 3-phase disturbance observer is changeable depending on a current of said three-phase brushless motor.

10. The electric power steering apparatus according to claim 6, wherein a spatial vector modulating section that superimposes a third harmonic wave is disposed at a subsequent stage of said 3-phase disturbance observer.

11. The electric power steering apparatus according to claim 7, wherein gains of said first and second sections are changeable depending on a motor rotational speed.

* * * * *